United States Patent [19]

Collonia

[11] 4,267,491
[45] May 12, 1981

[54] ELECTRICAL REGULATING DEVICE FOR SPEED CONTROL DEVICES

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 966,483

[22] Filed: Dec. 4, 1978

[30] Foreign Application Priority Data

Dec. 12, 1977 [DE] Fed. Rep. of Germany ....... 2755338

[51] Int. Cl.³ .............................................. H02P 5/16
[52] U.S. Cl. .................................. 318/311; 123/352; 180/179
[58] Field of Search ........................ 180/179; 123/102; 318/310, 311

[56] References Cited

U.S. PATENT DOCUMENTS

| | | | |
|---|---|---|---|
| 3,580,355 | 5/1971 | Kitano et al. | 123/102 |
| 3,804,193 | 4/1974 | Ikuta | 123/102 |
| 3,885,644 | 5/1975 | Seidler | 123/102 |
| 4,117,903 | 10/1978 | Fleischer et al. | 180/179 |
| 4,120,373 | 10/1978 | Fleischer | 180/179 |

Primary Examiner—David Smith, Jr.
Attorney, Agent, or Firm—Martin A. Farber

[57] ABSTRACT

An electrical regulating device, particularly for a speed control device for motor vehicles, with a servomotor, a rotatably mounted setting element which actuates the position or adjustment actuator, the setting element being in operative connection with the servomotor via an electro-magnetic coupling, and a monitoring stage for the mechanical functioning of the coupling. The monitoring stage contains a unit for recognizing the restoring speed of the setting element or the adjustment actuator, a unit for comparison of the actual resetting speed with a pregiven reference value and a unit for production of a signal upon an unsafe deviation of the actual resetting speed from the reference value.

4 Claims, 1 Drawing Figure

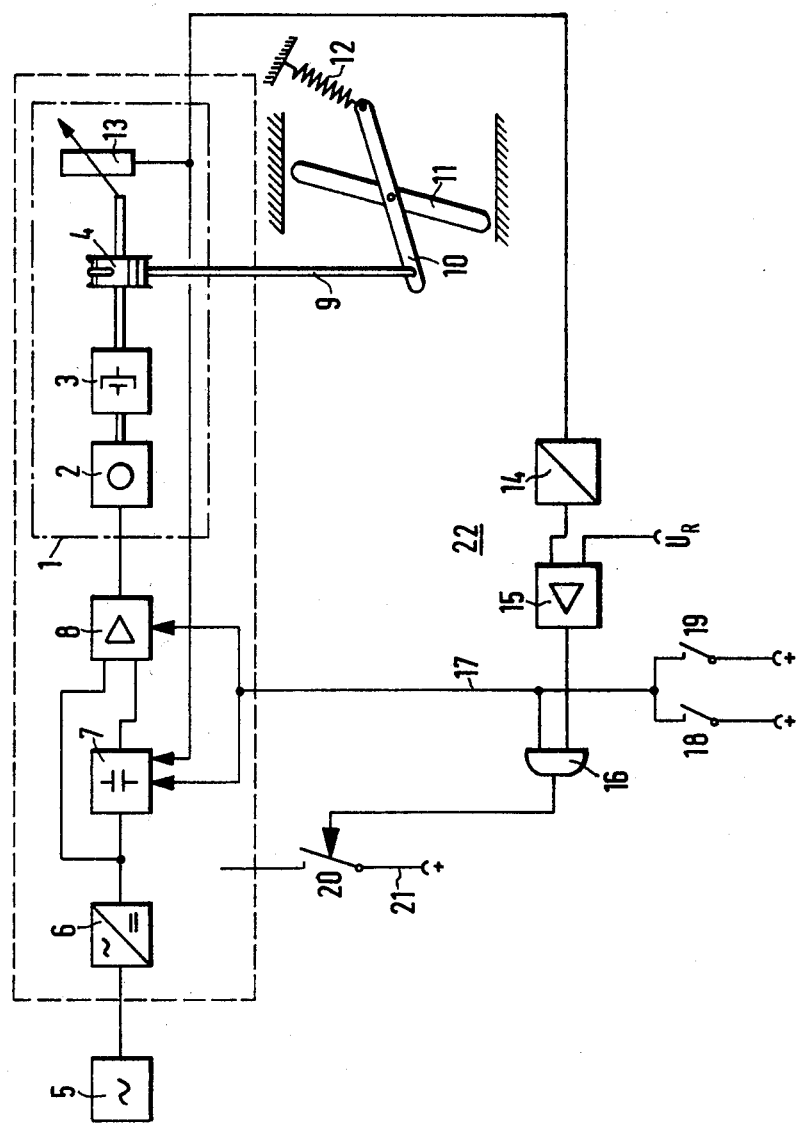

ELECTRICAL REGULATING DEVICE FOR SPEED CONTROL DEVICES

The invention relates to an electrical regulating device, particularly for a speed control device for motor vehicles, with a servomotor, a rotatably mounted setting element which actuates the position or adjustment actuator, the setting element being in operative connection with the servomotor via an electromagnetic coupling, and a monitoring stage for the mechanical functioning of the coupling.

Known setting or adjustment regulating devices of this type are found for example in speed control systems of motor vehicles, which permit travelling with a constantly controlled traveling speed. Likewise they can be used in speed control devices by which the position of the gas pedal is converted into an electrical desired value signal and is fed to an electrical controller. The output of the controller acts on the setting or adjusting regulating device, the latter being coupled with the throttle valve and the respective prevailing position of the throttle valve is converted into an electrical actual value signal and is sent to the actual value input of the controller. Such a device can be used instead of the conventional Bowden cable between the gas pedal and the throttle valve and consequently in comparison to such a mechanical connection has advantages in assembly and also advantages of other types.

Since a defective operation of the setting or adjustment device (herein also called the regulating device) can lead to dangerous driving situations, with one known regulating device a monitoring stage is provided for the mechanical functioning of the coupling which is located in the regulating device. With this monitoring stage the return interval of the setting element from its pivoted-out position into its rest position is measured and is compared to a predetermined value. Upon exceeding of the predetermined value, the monitoring stage emits a signal, which signal, for example, turns off the entire control device. Since the return interval of the setting element is shorter from a position of small pivoting-out than from a position of maximum pivoting-out, and in both cases as criterion for a faulty operation, still exceeding of the maximum possible permitted return interval is used, defects in operation can occur, which defects are not recognized by the monitoring stage until the setting element is moved back once from its position of maximum pivoting-out.

It is an object of the present invention to provide a device which avoids this disadvantage.

It is another object of the present invention to conceive and create a regulating device with a monitoring stage which is unobjectionable and permits safe and positive recognition or detection of all functioning defects of the coupling which is located in the setting or adjusting device (i.e., in the regulating device).

It is another object of the present invention to aid the solution of the above-mentioned object in the manner that the monitoring stage (22) contains means (e.g., 13, 14) for detecting or recognizing the resetting speed of the setting element (4) or the adjustment actuator (9), means (e.g., 15) for comparison of the actual resetting or release speed with a pregiven reference valve and means (e.g., 16) for production of a signal upon an unsafe or precarious deviation of the actual resetting speed from the reference value.

By means of the recognition of the resetting speed and its comparison with a predetermined reference value, a monitoring of the functioning or operation of the coupling is made possible, which monitoring is independent of the range of the pivoting-out of the setting element or the adjustment actuator and which monitoring consequently is uninterrupted. Any functional defects which occur at the coupling which is disposed in the regulating device are consequently positively or safely able to be detected or recognized and evaluated and utilized. A particular advantage of the invention is that such a monitoring stage is able to be realized with an exceptionally low expenditure.

According to an advantageous embodiment of the invention, as means for recognizing the resetting speed there is present an electrical position indicator or pickup - transmitter (13) which is coupled with the setting element (4), and a differentiating stage (14) is connected following the transmitter (13). The position indicator transmitter (13) in this manner supplies a voltage signal with a continuously increasing or decreasing amplitude to the differentiating stage, the latter converting this signal into a pulse with an amplitude which is proportional to the resetting speed of the setting element and adjustment actuator, respectively. Since in many cases of use or application, the regulating device is equipped with an electrical position indicator or transmitter which is coupled with the setting element (thus for example upon use of the regulating device in a speed control device, by which the position indicator or transmitter which is coupled with the setting element produces a voltage signal which is proportional to the position of the setting element, which voltage signal is sent to the actual value input of the electrical controller as an actual value signal), at least in these cases one can turn to the already existing position transmitter which can be used. In this manner the expense which is required for the monitoring stage is reduced quite considerably.

According to a further advantageous embodiment of the invention, for comparison of the actual restoring or resetting speed with a predetermined reference value and for production of a signal upon an unsafe deviation of both values, a comparator (15) is connected following the differentiating stage (14), the other input of the comparator being applied with a reference voltage and the output of the comparator being connected to one of the inputs of an AND member (16) whose other input is applied with a signal which releases or triggers the resetting of the setting element (4).

As a comparator in customary manner per se a corresponding wired operational amplifier can be used.

With the above and other objects and advantages in view, the present invention will become more clearly understood in connection with the detailed description of a preferred embodiment, when considered with the accompanying drawing of which the only FIGURE is a block circuit diagram of a regulating device in accordance with the invention, of which:

Referring now to the drawings, the setting or adjustment device 1 (i.e., the regulating device) comprises a servomotor 2, an electromagnetic clutch or coupling 3 which is coupled with the servomotor 2 and a setting or positioning element 4 which is mounted on the output shaft of the coupling 3. The regulating device 1 is incorporated in a speed control device. The latter comprises a speed pickup or transmitter 5, the output signal of which has a frequency proportional to the driving or traveling speed, which frequency is transformed in a frequency-voltage transformer 6 (the latter being connected in series following the transmitter 5) into a voltage which is proportional to the frequency. The output of the frequency-voltage transformer 6 on the one hand is connected indirectly via a memory or storage unit 7 for the desired value of the speed with a differential amplifier 8, and on the other hand is connected directly with the differential amplifier 8. The output of the differential amplifier 8 controls the servomotor 2 of the setting or adjustment device 1 (i.e., the regulating device).

The positioning element 4, which is in the form of a disc or pulley, is connected with a flexible positioning or adjustment actuator 9. The free end of the positioning actuator 9 is connected with and acts on a lever 10 of the throttle valve 11. The other end of the lever 10 is arrested or bound by means of a tension spring 12 connected thereto, such that the setting element 4 upon rotation in one direction pivots the lever 10 under tensioning of the spring 12, and upon actuation of the coupling 3 in the sense of a separation or disconnection, the setting element 4 is rotated back into its rest position by means of the spring 12.

Moreover an electrical position indicator or pickup-transmitter 13 is coupled with the output shaft of the coupling 3, the output of the transmitter 13 being operatively connected with one of the inputs of a comparator 15 via a differentiating stage 14. The other input of the comparator 15 is applied with a constant reference voltage $U_R$.

The output of the comparator 15 is connected to one of the inputs of an AND gate 16, the other input of the AND gate being connected with a control line 17. Over the control line 17 and two switches 18 and 19 connected thereto, the control device is able to be switched inoperatively off. The switch 18 stands in operative connection thereby with the foot-brake of the motor vehicle and the switch 19 stands in operative connection with the clutch of the vehicle such that upon an actuation of the clutch or of the foot-brake a positive switch-off signal is sent to the controller. The output of the AND gate 16 operatively acts on a switch 20, which switch 20 lies in the current supply line 21 for the controller.

By means of the monitoring stage, which is designated generally with the numeral 22, there is brought about a continuous monitoring of the unobjectionable functioning of the coupling 3, of the position actuator 9 and of the throttle valve 11. In this manner every movement of the setting or adjusting element 4 is converted by means of the position pickup-transmitter 13 into a self-changing voltage signal, which signal is differentiated in the differentiating stage 14 and thereafter is compared in the comparator 15 with the predetermined reference voltage. If the changing speed of the signal which comes from the position transmitter 13 is too small, then the comparator 15 sends an output signal to the AND gate 16. This can be the case, for example, if during a control operation the setting element 4 is turned. As a consequence of this, no control signal occurs at the output of the AND member 16. Only when the switch 18 or the switch 19 is closed by actuation of the brake or the clutch of the vehicle and the controller is switched inoperatively off and as a consequence of this the setting element 4 is rotated back into its rest position via the coupling 3 (the latter being actuated now in the sense of a separation) by means of the spring 12, if this return movement is too slow, then the signal which appears at the output of the comparator 15 and which is sent to one input of the AND gate 16 leads to a triggering or connecting through of the AND gate 16 into conduction, since the other input of the AND gate 16 also is applied with positive potential by means of the closed switch 18 or 19. The result is that the entire control device is turned off by means of the switch 20. The switch 20 may be any switch which can close upon receiving a signal from the output of the AND gate 16.

The lever 10 is securely connected to the throttle valve 11 such that pivoting of the lever causes a pivoting of the throttle valve 11.

While there has been disclosed one embodiment of the invention it is to be understood that this embodiment is given by example only and not in a limiting sense.

I claim:

1. In an electrical regulating device, particularly for a speed control device for motor vehicles with a servomotor, a rotatably mounted setting element which actuates an adjustment actuator, the setting element being in operative connection with the servomotor via an electromagnetic coupling, and a monitoring stage for the mechanical functioning of the coupling, the improvement wherein
the monitoring stage contains,
means for detecting the resetting speed of the setting element or the adjustment actuator,
means for comparing the actual resetting speed with a pregiven reference value, and
means for producing a signal upon an unsafe deviation of the actual resetting speed from the reference value,
said means for detecting the resetting speed constitutes an electrical position transmitter coupled with said setting element,
a differentiator stage is connected to and following said transmitter,
said comparing means comprises a comparator having one input connected to and following said differentiator stage,
said signal producing means includes an AND gate having two inputs,
said comparator has another input being applied with a reference voltage and an output connected to one of the inputs of said AND gate,
the other input of said AND gate is appliable with a signal which releases the resetting of the setting element,
a current supply line is connected to the speed control device,
a switch is connected in said current supply line,
the output of said AND gate is operatively connected to said switch, the latter constituting means for being opened to turn-off the control device when an output signal appears at the output of said AND gate.

2. The electrical regulating device as set forth in claim 1, further comprising
a foot-brake switch and a clutch switch are connected to said other input of said AND gate and constitute respective means for turning the regulating device off and simultaneously applying said other input of said AND gate with said signal.

3. The electrical regulating device as set forth in claim 1, further comprising means for selectively releasing the resetting of the setting element by said signal and for simultaneously applying said other input of said AND gate with said signal.

4. The electrical regulating device as set forth in claim 1, further comprising a lever has one end connected to the adjustment actuator,
a tension spring is connected to the other end of said lever,
a throttle valve is secured to said lever at a pivot point of both.

* * * * *